United States Patent
De La Rupelle et al.

(10) Patent No.: US 8,898,884 B2
(45) Date of Patent: Dec. 2, 2014

(54) OPTIMISED MANUFACTURING PROCESS FOR A VANED MONOBLOC DISC BY ABRASIVE WATER JET

(75) Inventors: Perrine De La Rupelle, Paris (FR); Serge Berlanger, Leuville sur Orge (FR); Mitch Miller, Clover, SC (US); William Pearson, Clover, SC (US); Mark Stromberg, Clover, SC (US)

(73) Assignee: Snecma, Paris (FR)

( * ) Notice: Subject to any disclaimer, the term of this patent is extended or adjusted under 35 U.S.C. 154(b) by 495 days.

(21) Appl. No.: 13/388,677

(22) PCT Filed: Aug. 5, 2010
(Under 37 CFR 1.47)

(86) PCT No.: PCT/EP2010/061422
§ 371 (c)(1),
(2), (4) Date: Sep. 14, 2012

(87) PCT Pub. No.: WO2011/015626
PCT Pub. Date: Feb. 10, 2011

(65) Prior Publication Data
US 2013/0171915 A1 Jul. 4, 2013

(30) Foreign Application Priority Data
Aug. 7, 2009 (FR) .................................. 09 55575

(51) Int. Cl.
*B23P 13/04* (2006.01)
*B24C 1/04* (2006.01)
*B23P 15/00* (2006.01)
*B23P 13/02* (2006.01)
*B23C 3/18* (2006.01)
*F01D 5/34* (2006.01)

(52) U.S. Cl.
CPC ............ *B24C 1/045* (2013.01); *B23P 15/006* (2013.01); *B23P 13/02* (2013.01); *B23C 2215/44* (2013.01); *B23C 3/18* (2013.01); *F01D 5/34* (2013.01); *F05D 2230/10* (2013.01)
USPC ................. 29/558; 295/889.7; 295/889.23; 451/38

(58) Field of Classification Search
USPC ............... 29/558, 557, 889.23, 889.2, 889.7; 451/38
See application file for complete search history.

(56) References Cited

U.S. PATENT DOCUMENTS

| | | | |
|---|---|---|---|
| 5,704,824 | A | 1/1998 | Hashish et al. |
| 6,276,899 | B1 | 8/2001 | Lambert et al. |
| 2006/0085979 | A1 | 4/2006 | Bayer et al. |

FOREIGN PATENT DOCUMENTS

| | | |
|---|---|---|
| EP | 1 652 611 | 5/2006 |
| FR | 2 699 850 | 7/1994 |
| GB | 2 454 187 | 5/2009 |

OTHER PUBLICATIONS

U.S. Appl. No. 13/388,787, filed Feb. 3, 2012, De La Rupelle, et al.
International Search Report issued on Sep. 29, 2010 in PCT/EP10/061422 filed on Aug. 5, 2010.

*Primary Examiner* — Ryan J Walters
(74) *Attorney, Agent, or Firm* — Oblon, Spivak, McClelland, Maier & Neustadt, L.L.P.

(57) ABSTRACT

A manufacturing process of a monobloc vaned disc including a cutout by abrasive water jet of a block of material in general form of a disc, carried out so as to remove material from the block at a level of inter-vane spaces to reveal vane preforms extending radially from a hub, the cutout by abrasive water jet including, for making each inter-vane space: a first triple-axis cutout of a piece passing through the thickness of the block, used such that the cutout piece escapes from the block automatically by gravity; followed by at least one enhancement cutout.

9 Claims, 10 Drawing Sheets

OPTIMISED MANUFACTURING PROCESS FOR A VANED MONOBLOC DISC BY ABRASIVE WATER JET

TECHNICAL FIELD

The present invention relates in general to the field of manufacturing monobloc vaned discs, preferably for aircraft turbine engines.

PRIOR ART

To make a monobloc vaned disc, also called <<MVD>>, or <<blisk>>, a cutout step by abrasive water jet of a block of material can be used, generally followed by one or more milling steps.

Employing a cutout step by abrasive water jet, prior to milling, helps reduce time and production costs relative to a process based solely on milling. This is explained in particular by the fact that such a manufacturing process requires the removal of around 75% of material from the initial block to end up with MVD. Removal of a majority of this material by cutout by abrasive jet actually reduces production time, and also limits wearing of millers.

Normally, the cutout step by abrasive water jet consists essentially of cutting out a piece of extremely complex form over the entire thickness of the initial block. This cutout in fact follows a complex trajectory, called five-axis, with a view to cutting out a piece of twisted or helicoidal form, similar to the form of an inter-vane space.

The disadvantage of such a step is that the stability of the abrasive water jet is sharply impacted by the complex nature of the trajectory of this jet, and by the considerable thickness to be cut out, since the quality of the jet degrades progressively from the entry to the exit. To minimise this problem of stability of the jet, it proves necessary to cut out at relatively slow speeds, translated by still considerable operating times.

The duration for performing this cutout step by abrasive water jet is also greatly prolonged by the necessity of manually removing the pieces of twisted form remaining lodged in the block of material after cutout.

OBJECT OF THE INVENTION

The aim of the invention is thus to at least partially rectify the drawbacks mentioned hereinabove, relative to executions of the prior art.

To do this, the object of the invention is a manufacturing process of a monobloc vaned disc, comprising a cutout step by abrasive water jet of a block of material in general form of a disc, carried out so as to remove material from the block at the level of inter-vane spaces to reveal vane preforms extending radially from a hub, said cutout step by abrasive water jet comprising, for making each inter-vane space:
  a first triple-axis cutout of a piece passing through the thickness of the block, employed such that said cutout piece escapes from the block automatically by gravity; followed by
  at least one enhancement cutout.

The invention essentially ends up with a reliable cutout step by abrasive water jet to obtain enhanced vane preforms, and reduce the duration of implementation of this cutout step by abrasive water jet, which translates evidently by reduction in the duration of carrying out the entire manufacturing process.

With respect to the duration of performing this step, the latter is first reduced by the fact that the first cutout passing through results in a piece which escapes automatically by gravity, without requiring the intervention of the operator. This functionality is obtained by particular positioning of the block, preferably arranged horizontally, but especially due to the cylindrical nature of the piece obtained by the triple-axis cutout. Since the number of inter-vane spaces on a MVD is considerable, the time gain resulting from the automatic fall of the first pieces is considerable.

Also, the simplicity of the trajectory of the first cutout reinforces the stability of the jet, and consequently proves propitious to using a high cutout speed for this first cutout passing through.

In addition, subsequent enhancement cutout(s) can be made on lesser thicknesses of material. This reinforces the stability of the jet, thus reducing the deviation effect of the jet. The cutout speeds can also be high, and the precision of the cutout reinforced.

According to the invention, there is at least one enhancement cutout provided, from any one of the two faces of the block, aiming to cut out any zone of the block previously obtained by said first connecting cutout. This zone can for example be that which most undergoes the deviation effect of the abrasive water jet encountered during said first cutout, that is, the zone close to the jet outlet. But, since this particular zone is reworked by enhancement cutout, deviation of the jet during the first cutout can thus be considerable without being harmful. This is also friendly to using a high cutout speed to make the first cut.

Said cutout step by abrasive water jet, carried out by means of a tool comprising an ejection head of an abrasive water jet, preferably comprises:
  said first cutout, carried out with said ejection head opposite a first face of the block; followed by
  several enhancement cutouts, whereof at least one of these is carried out with said ejection head opposite said first face of the block, and whereof at least another one is carried out with said ejection head opposite a second face of the block, opposite the first.

The fact of making cutouts by abrasive water jet from the two faces of the block of material gives better accessibility. This produces vane preforms closest to the final sides, and thus reduces operating time of subsequent milling events, when these prove necessary. Also, the overall manufacturing time of the MVD is advantageously reduced.

Also, this improved accessibility to the surfaces to be cut out is not only used to enhance the vane preforms obtained, but also to orient the jet in the best way possible relative to each surface to be cut out, reinforcing the reliability of the process.

In addition, it is noted that multiplication of the enhancement cutouts reduces the overall time of execution of the cutout step by abrasive water jet. In fact, as mentioned hereinabove, the first triple-axis cutout can relate to a maximal thickness, whereas each enhancement cutout can be done on a reduced thickness of the block, following a complex trajectory, for example five-axis. Therefore, it eventuates that only one of the two restricting parameters in terms of stability of jet, specifically the cutout thickness and the trajectory complexity, is retained in each of the two types of cutout, employing high cutout speeds for each of these two types of cutout.

By way of preferred example, the cutout step by abrasive water jet comprises the first connecting cutout, between two and four enhancement cutouts to the side of the first face of the block, and also between two and four enhancement cutouts to the side of the second face of the block.

Preferably, during said cutout step by abrasive water jet aimed at obtaining all the inter-vane spaces, the following are successively carried out:
- all the cutouts with said ejection head opposite the first face of the block;
- a relative shift between the block and the ejection head to guide the latter opposite the second face of the block; and
- all the cutouts with said ejection head opposite the second face of the block.

This optimises the execution duration of the cutout step by abrasive water jet. By way of preference, said relative shift between the block and the ejection head is done by turning over the block.

Preferably, said cutout step by abrasive water jet is carried out such that at least one cutout piece during enhancement cutout escapes from the block automatically by gravity. This limits the number of interventions by the operator during the cutout step by abrasive water jet, for an even more optimised execution time. In this respect, the pieces concerned, such as the piece obtained during the first cutout, are provided to fall by gravity when separated from the block, without the latter having to move.

Preferably, to still limit the number of interventions by the operator, said cutout step by abrasive water jet is carried out such that for at least one cutout piece during enhancement cutout and remaining blocked in its associated inter-vane space after its cutout, said piece is split, by cutting by abrasive water jet, into at least two sub-pieces capable of escaping from the block automatically by gravity.

As mentioned hereinabove, each enhancement cutout is preferably a five-axis cutout.

Preferably, said cutout step by abrasive water jet of the block of material is carried out so as to reveal the vane preforms extending radially from the hub, while preserving material forming connecting means between at least two directly consecutive vane preforms, said connecting means being spaced radially from said hub.

Therefore, this preferred embodiment is remarkable in that it provides, during the cutout step by abrasive water jet, revealing connecting means between at least two vane preforms, and preferably between all these vane preforms. This strictly limits, or even eradicates, the deformations and the vibrations of the vanes during their manufacture, given that they are still being held mechanically by the material of the initial block.

This specificity advantageously applies to the different tools of high advance speeds, decreasing production time, without impacting the quality of the finished MVD. In addition, decreasing production time and decreasing the vibrations of the vanes during their manufacture slows down wear on tools, in particular wear on milling machines, advantageously limiting production costs.

Preferably, the cutout step by abrasive water jet is carried out such that said connecting means combine to connect a number of vane preforms strictly greater than three, preferably directly consecutive. However, several sets of directly consecutive interconnected preforms could be envisaged but with the sets not joined. Irrespectively, the number of vane preforms kept together by the connecting means, and the arrangement of the latter on the preforms, can be adapted, as needed.

According to a preferred realisation, the cutout step by abrasive water jet is carried out such that said connecting means substantially form a ring, preferably centred on the axis of the disc. This ring preferably extends over 360°, optionally being interrupted solely by the vane preforms which it connects. However, as mentioned hereinabove, this ring could not be fully closed, and specifically not connect some directly consecutive preforms.

However, the cutout step by abrasive water jet is preferably carried out such that said ring joins together all the vane preforms, each intended to subsequently constitute a vane of the MVD. In such case, it is preferably provided that the cutout step by abrasive water jet is carried out in such a way that said ring joins together the heads of the vane preforms. The ring then forms a peripheral annular portion of the cutout block, with the vane preforms extending radially towards the interior from this ring, in the direction of the disc.

Preferably, the process comprises also:
- a milling step of the vane preforms carried out to produce profiled vane blanks; and
- a finishing milling step of the vane blanks, to produce the vanes in the final profile.

Preferably, the material forming connecting means is kept to the end of the finishing milling step, after which this material is removed. However, this material could be removed earlier, without departing from the scope of the invention.

Of course, other classic steps can be employed in the process according to the invention, such as:
- turning the block of material prior to the cutout step by abrasive water jet;
- polishing and/or blasting of the vanes after the finishing step;
- cutting the vanes to length;
- and balancing of the MVD.

Preferably, said monobloc vaned disc has a diameter greater than or equal to 800 mm. In this respect, it is specified that the presence of connecting means holding the vanes between them during manufacture allows large-diameter MVDs to be manufactured, with long vanes, since deformations and vibrations therefrom are reduced, or even eliminated. Preferably, the vanes have a minimal length of 150 mm.

Preferably, said monobloc vaned disc has a disc of thickness greater than or equal to 100 mm. However, it can have a thickness of the order of 160 mm, or even more, due to high performance attainable by the abrasive water jet cutting technique. This thickness also corresponds substantially to the distance according to which each vane extends, applied according to the axis of the MVD, between the leading edge and the trailing edge.

Preferably, the vanes of the monobloc vaned disc are twisted, the angle of twist extending to 45°, or even more.

Preferably, said block of material used is made of titanium or one of its alloys.

Preferably, said monobloc vaned disc is a monobloc vaned disc for an aircraft turbine engine.

Even more preferably, said monobloc vaned disc is a monobloc vaned disc of an aircraft turbine engine turbine rotor or compressor.

Other advantages and characteristics of the invention will emerge from the following detailed non-limiting description.

BRIEF DESCRIPTION OF THE DRAWINGS

This description will be given with respect to the attached diagrams, in which.

DETAILED DESCRIPTION OF PREFERRED EMBODIMENTS

Figure 1:
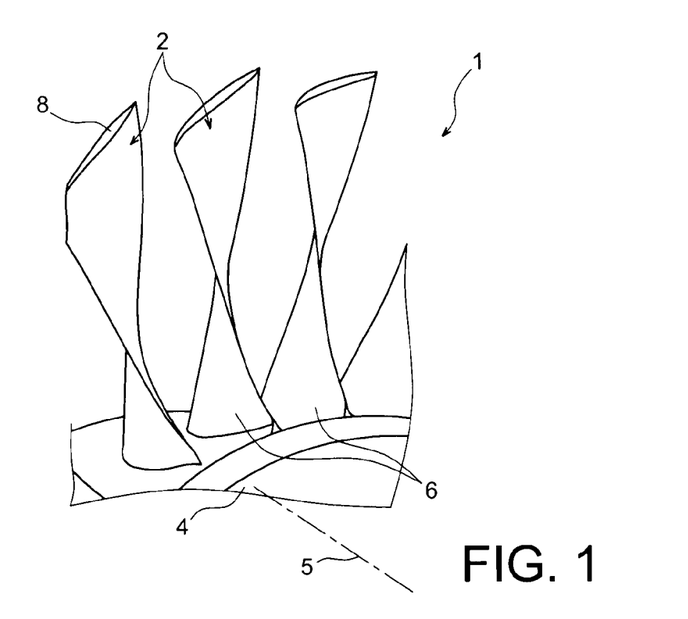
FIG. 1 illustrates a partial view in perspective of a monobloc vaned disc for turbine engine, capable of being obtained by using the manufacturing process according to the present invention.

In reference first of all to FIG. 1, this shows a monobloc vaned disc 1 to be obtained by using a manufacturing process according to the present invention. It is preferably designed to constitute a compressor or turbine rotor of an aircraft turbine engine.

The monobloc vaned disc, hereinafter called MVD, which is to be obtained by the inventive process, is of large dimension, specifically having a diameter greater than or equal to 800 mm, of vanes 2 of a length at least equal to 150 mm, and a hub 4 of thickness "e" greater than or equal to 130 mm. Also, the vanes borne by the hub 4 of central axis 5 are twisted substantially, since the angle of twist can reach 45°, or even more. By way of information, this angle corresponds to the notional angle between the foot 6 and the head 8 of the same vane 2.

A preferred embodiment of the manufacturing process of the MVD 1 will now be described in reference to the following figures.

First of all, a block of material made of titanium alloy, also called "raw monobloc" and preferably pre-machined, undergoes a first turning step, for example with the aim of machining this block to 1 mm of the final sides.

The following step, outlined in FIGS. 2a to 2m, consists of cutting by abrasive water jet of the full block, so as to reveal vane preforms separated by inter-vane spaces.

To do this, a tool (not shown) for cutting out by water jet at very high pressure is used, for example 3000 bars, and very high precision, for example six axes. It is the very high level of pressure of the water which conveys the abrasive in optimising its cutting effect on the material. In a familiar way, the water jet is created by means of a nozzle made of diamond or sapphire. Also, a mixing chamber adds the abrasive, such as sand. In this respect, a focussing cannon homogenises the water and sand by focussing the latter on the zone to be cut out. Throughout the following description the focussing cannon 116 will more generally be called ejection head of the tool.

This abrasive jet cutting technique enables a substantial removal rate of material, as well as good repeatability. It proves well adapted to the removal of material intended to create inter-vane spaces entirely passing through the thickness "e" of the block of material according to its axis 5.

Figure 2A:
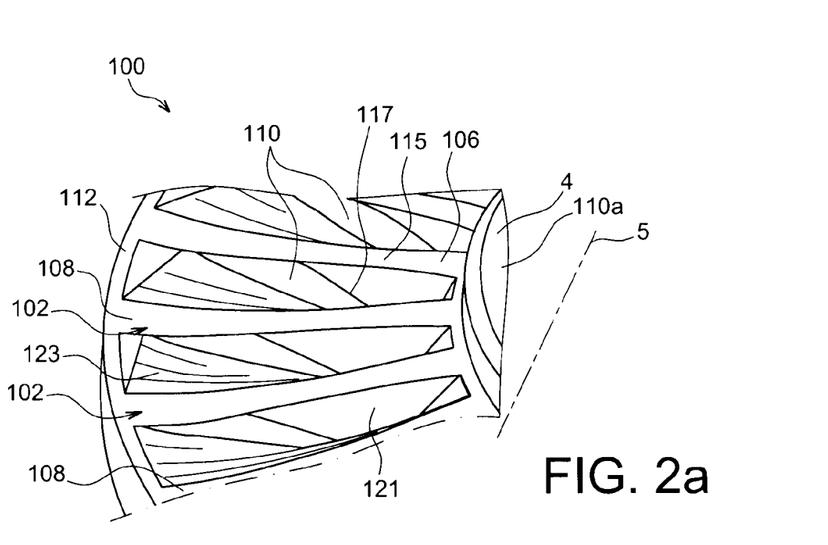
FIGS. 2a to 2m illustrate views sketching the cutout step by abrasive water jet of the manufacturing process.

In this respect, FIG. 2a shows part of the block of material 100, once the cutout step by abrasive water jet is completed. This block thus has vane preforms 102 extending radially from the hub 4, that is, orthogonally to the central axis 5. In general, cutting out is performed in the thickness of the block 100 so as to reveal inter-vane spaces 110 circumferentially between the directly consecutive vane preforms 102.

Also, it is carried out so as to reveal connecting means between the preforms 102, here taking the form of a ring 112 centred on the axis 5 and preferably connecting all the heads 108 of the vane preforms 102. Therefore, the ring 112 constitutes a peripheral annular portion of the cutout block 100, and consequently creates external radial delimitation of the inter-vane spaces 110.

This cutout step by abrasive water jet is employed by making cutouts carried out with the ejection head 116 opposite a first face 110a of the block in the form of a disc, then by making cutouts carried out with the ejection head 116 opposite a second face 110b of this same block, opposite the first surface 110a.

Figure 2B:
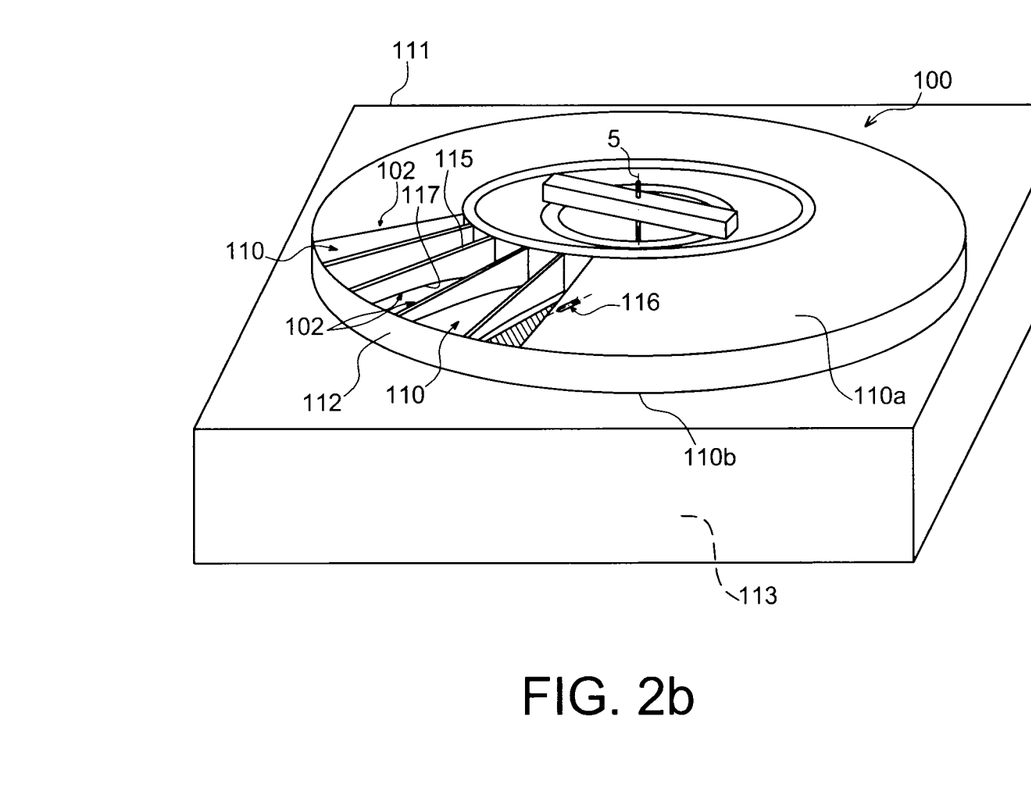

To operate cutting out from the first face 110a, the block 100 is held firmly, removably, on a support 111 so as to adopt a substantially horizontal position, that is, with its axis 5 substantially orthogonal to the ground, as shown in FIG. 2b. The support 111 has a container 113, open to the top, dedicated to collecting the cutout pieces which escape automatically by gravity from the block 100. During these cutting events, the second face 110b is thus placed against the support 111.

To operate cutting out from the second face 110b, the block 100 is released from the support 111, turned round 180°, then reattached to this support 111 with the first face 110a placed against the latter, and the second face 110b oriented upwards to cooperate with the ejection head 116 of the tool moving up above the block 110.

It is noted that in the preferred embodiment illustrated, the leading edge 115 of the vane preforms 102 is located to the side of the first face 110a, whereas their trailing edge 117 is located to the side of the second face 110b.

Indexing means (not shown) for precisely positioning the block 100 on the support 111, in its two positions, allow greater reliability of the process.

Figure 2C:
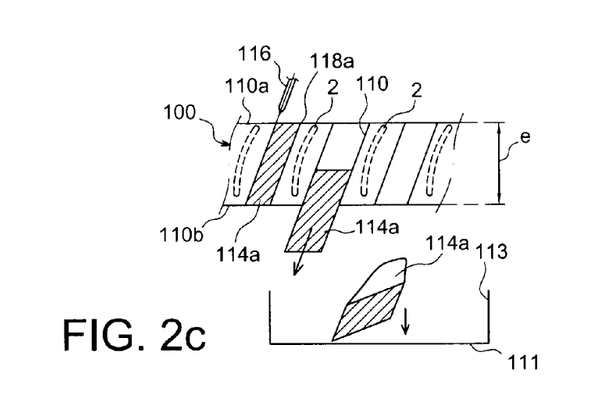

In reference to FIG. 2c, a first cutout, carried out from the first face 110a, aims to remove a first piece of material 114a extending substantially cylindrically, since they result from a so-called cutout triple-axis, during which the ejection head only is thus moved according to three axes of translation orthogonal to one another. In this case, one of the three axes constitutes the longitudinal axis of the cylindrical form of the piece obtained 114a, which extends over the entire thickness of the block 100. It is noted that since the tool has six axes, it produces triple-axis trajectory with any inclination of the ejection head 116, an inclination which is thus retained during the whole cutout. As is evident in FIG. 2c, the first triple-axis cutout is carried out with the ejection head of the jet 116 inclined relative to the vertical, so as to be oriented substantially parallel to the final desired inter-vane space.

This first cutout, carried out at high speed made possible especially because of its simple trajectory, has substantial volume, corresponding preferably between 40 and 80% of the final volume of the associated inter-vane space 110 obtained on completion of the cutout step by abrasive water jet.

Figure 2D:
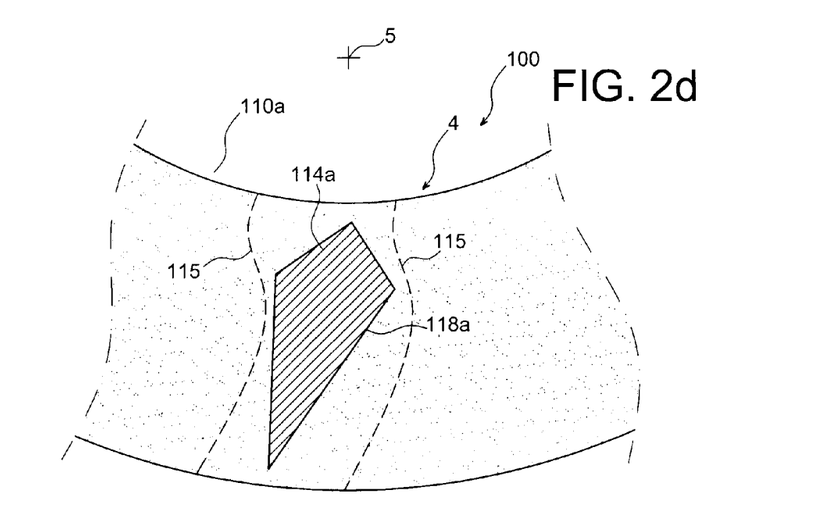

In reference to the schematic illustration of FIG. 2d, showing the leading edges 115 of two successive vane preforms to be obtained, it is evident that the first triple-axis cutout operation in fact aims to cut out the first piece of material 114a by moving the ejection head of the jet along a closed line 118a passing near the hub 4, and near the radial external end of the block, without reaching the latter so as to leave material for formation of the ring. Overall, the line 118a has the form of two Vs opposite and connected to one another, one of the points being oriented radially to the interior and located near the hub 4, and the other point being oriented radially to the outside and located near the radial external end of the block.

As soon as the line 118a closes up, implying the end of the first cutout step and separation of the first piece 114a from the block 100, this piece 114a escapes automatically by gravity from this same block. In fact, as shown in FIG. 2c, under the effect of gravity alone the piece 114a slides down in the direction of the ejection head 116, relative to the connecting orifice 119 which it releases as it falls. It finishes its fall in the carefully positioned container 113, and thus requires no intervention by the operator.

As is evident from this same figure, in any section orthogonal to the radial direction, the first piece 114a takes the overall form of a parallelogram whereof the two opposite sides, extending according to the thickness of the block, pass respectively near the two directly consecutive vanes 2 intended to be obtained once the process is complete.

A plurality of enhancement cutouts is then realised by abrasive water jet, still from the first face 110a of the block 100, in order to come closest to the final sides. All subsequent enhancement cutouts, whether they are carried out from the first face 110a or the second face 110b, are preferably cutouts of complex shapes known as five-axis form, that is, the trajectory is obtained by moving the ejection head not only according to three degrees of liberty in translation, but also according to two degrees of liberty in rotation. Also, these enhancement cutouts are preferably made on minimal thicknesses, over all or part of the thickness of the block. In this respect, some enhancement cutouts result in a piece whereof part corresponds to the whole thickness of the block, and whereof another part extends only over a fraction of the thickness of this same block, the thickness of which generally decreases moving radially to the exterior.

Therefore, it eventuates that a single one of the two parameters restricting in terms of jet stability, specifically the cutout thickness and the trajectory complexity, is retained for the first cutout and the enhancement cutouts, which allows use of high cutout speeds for each of these two types of cutout.

Figure 2E:
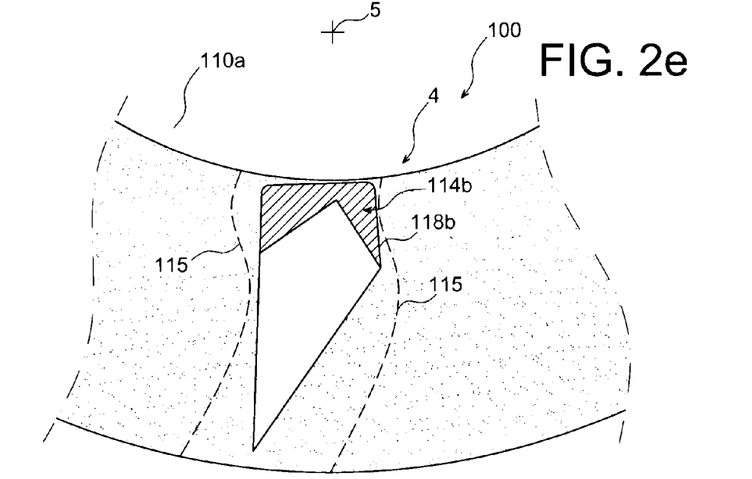

An enhancement cutout of a second piece 114b is then made by moving the ejection head of the jet along an open line 118b passing close to the hub 4, and having an overall form of a U open radially to the outside and whereof the base follows the hub 4. The two ends of the U extend respectively as far as two junctions of the two V forms by the first cutout, as shown in FIG. 2e.

Figure 2F:
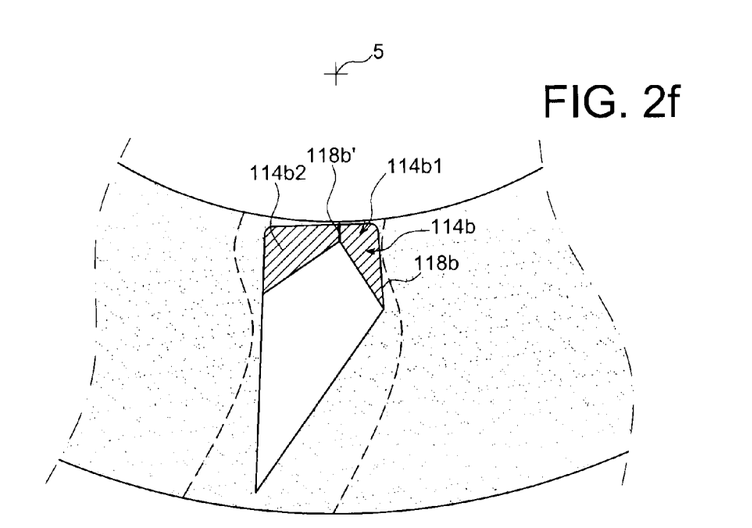

The second piece extends largely over the entire thickness of the block, and has a complex form. For this reason, it remains blocked in its associated inter-vane space after its cutout. So, to ensure its release from the block, the second piece 114b is split by cutting by abrasive water jet into two sub-pieces 114b1, 114b2 capable of escaping from the block automatically by gravity, passing through the inter-vane space in formation. Here too, it is under the sole effect of gravity that the two sub-pieces 114b1, 114b2 fall down, completing their fall in the container of the support. In the embodiment shown, the cutout line 118b' of the piece 118 takes the form of a straight line of minimal length, initiated from the point of the inner V of the preceding cutout, as is shown in FIG. 2f.

Figure 2G:
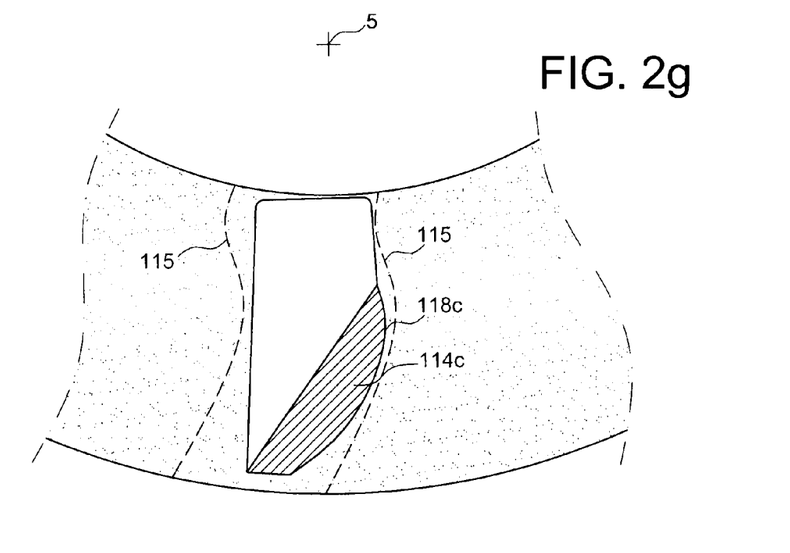

An enhancement cutout of a third piece 114c is then made by moving the ejection head of the jet along an open line 118c starting from the point of the inner V of the first cutout, then passing as closely as possible to the leading edge 115 of one of the vane preforms, to then rejoin one of the two junctions of the two V formed by the first cutout, as is shown in FIG. 2g.

The third piece 114c extends largely over the entire thickness of the block, from the vane head and over one part only of the radial length of the vane preform. It is preferably removed manually, or, according to its form, also falls automatically by gravity into the container of the support.

Figure 2H:
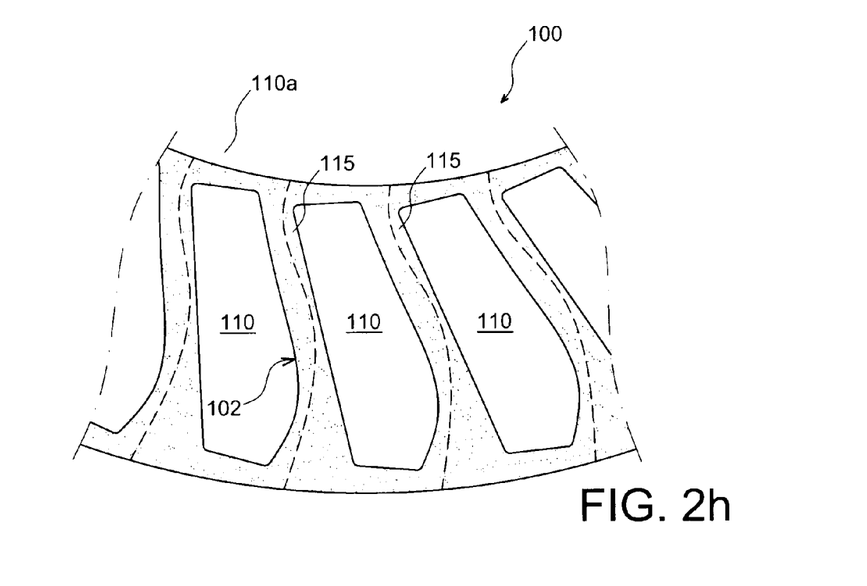

FIG. 2h shows the block 100 once all the cutouts from the first face 110a are made. Each of the three pieces 114a, 114b, 114c of an inter-vane space 110 is preferably made as a type of cutout before cutting out of the following inter-vane space takes place, even if it could be otherwise, without departing from the scope of the invention.

Figure 2I:
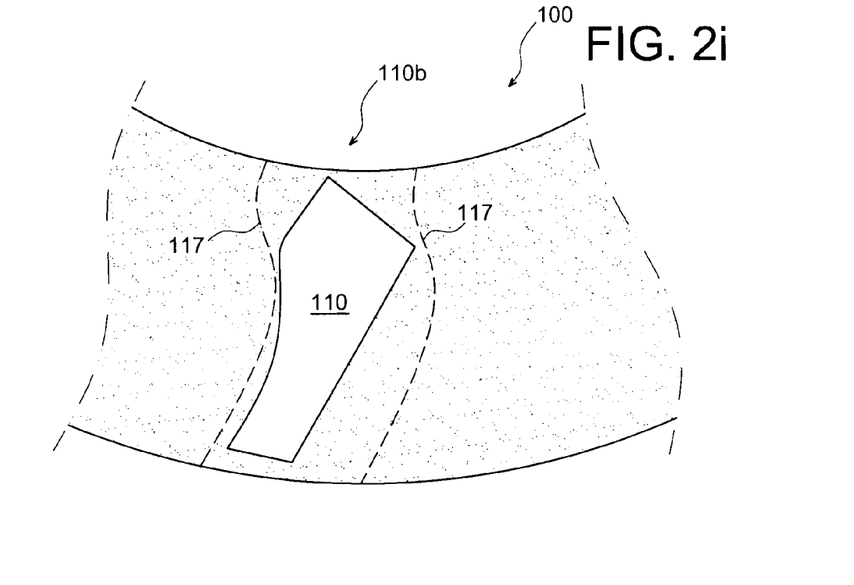

Next, the block 100 is returned to its support to allow the making of enhancement cutouts by abrasive water jet from the second face 110b. These cutouts thus enhance the form of the inter-vane spaces 110, one of which is shown in FIG. 2i, such as obtained after the cutouts made from the first face 110a. All the cutout pieces fall automatically by gravity into the container of the support.

Figure 2J:
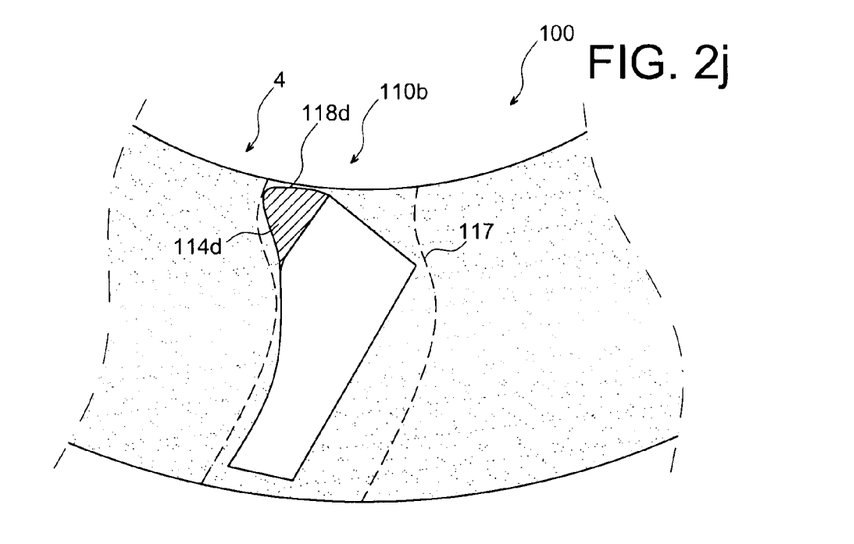
Figure 2K:
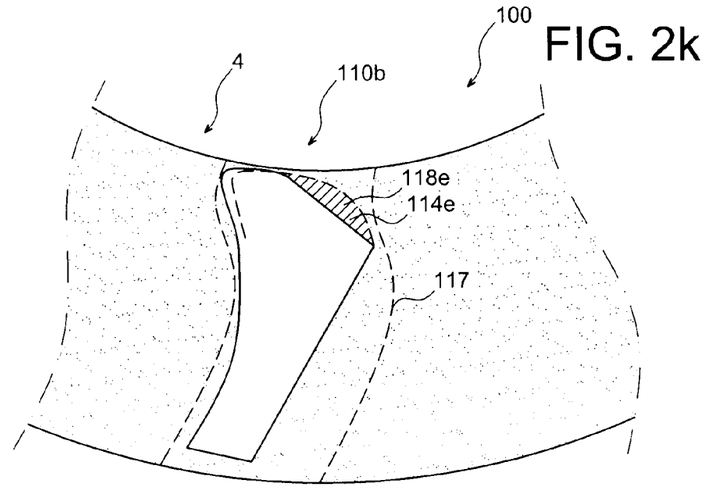
Figure 2L:
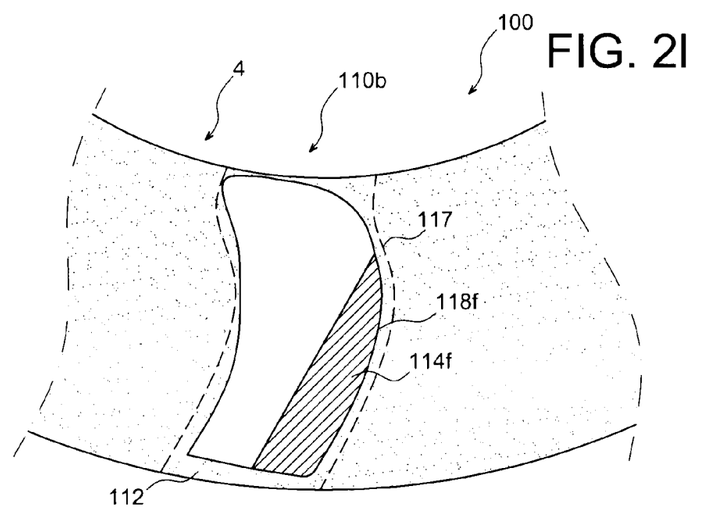

First of all, this concerns an enhancement cutout of a fourth piece 114d made by moving the ejection head of the jet along an open line 118d of FIG. 2j, following part of the hub 4 and alongside part of the trailing edge 117 of one of the vane preforms. It then concerns an enhancement cutout of a fifth piece 114e by moving the ejection head of the jet along an open line 118e passing close to the hub 4, and overall having the form of a U open radially to the outside and whereof the base follows the hub 4, as shown in FIG. 2k. This cutout is made only on part of the thickness of the block 100. Finally, an enhancement cutout is made of a sixth piece 114f by moving the ejection head of the jet along an open line 118f starting from the radial end of the block to delimit the ring 112, then passing as close as possible to the trailing edge 117 of one of the vane preforms, to then rejoin one of the two junctions of the two V formed by the first cutout, as shown in FIG. 2g.

Once all these cutouts are made, the block now has only the vane preforms 102 connected to one another at the level of their head 108, by the ring 112. The cutout step by abrasive water jet is then completed.

Figure 2M:
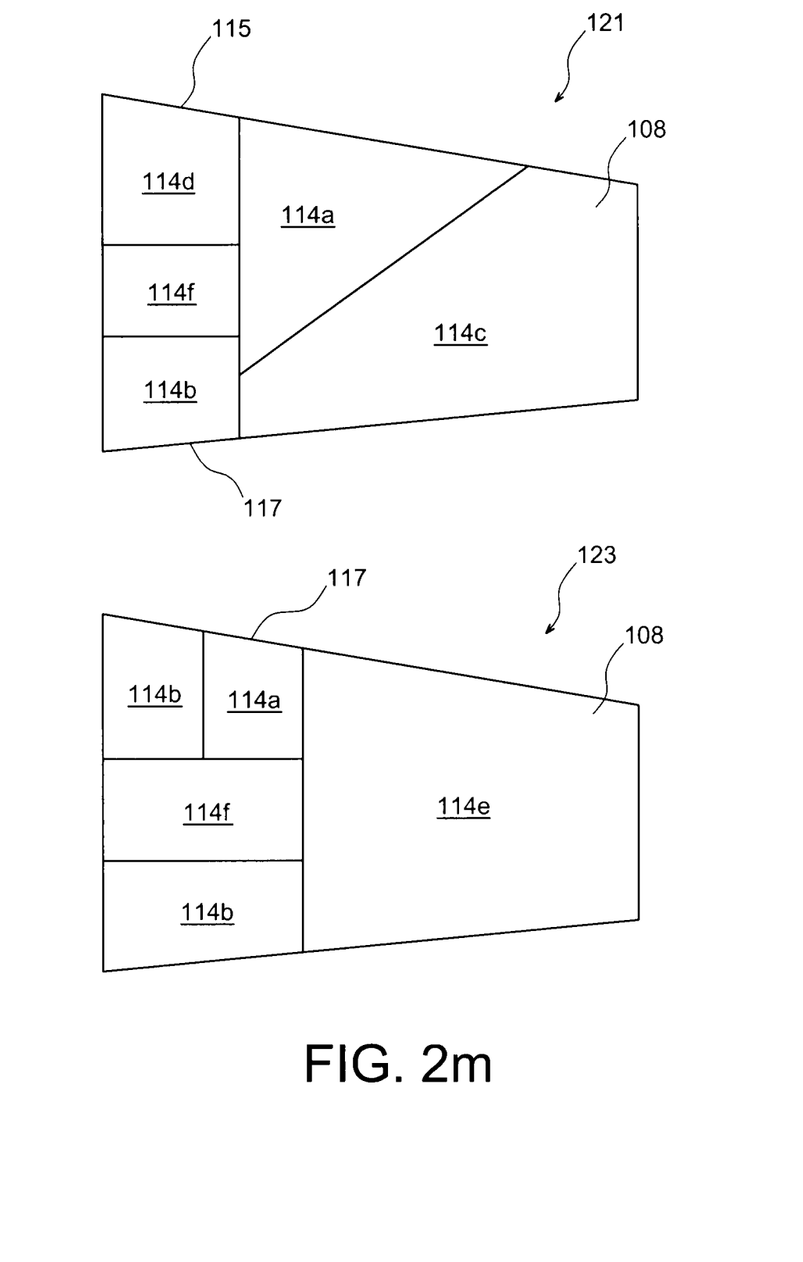

Each resulting vane preform 102 thus has an extrados surface 121 and an intrados surface 123, as shown in FIG. 2a. In this respect, it is noted that each of the extrados surfaces 121 and intrados surfaces 123 is composed of portions of surfaces resulting from the different cutouts. FIG. 2m schematically shows the segmentation of each of these two surfaces 121, 123 shown flat, each surface portion bearing the numerical value of the cutout piece which revealed it.

Next, the manufacturing process is continued by using a milling step for the vane preforms 102, carried out so as to obtain profiled vane blanks 202. In other terms, the objective of this step, employed for example by means of a five-axis milling tool, is to remove the material remaining on the vane preforms 102 to then arrive as closely as possible to the final sides, for example 0.6 mm. Because of the highly enhanced form of the preforms 102 obtained following the cutout step by abrasive water jet, at least part of the surface of these preforms is already in the preferred profile, and thus does not need such milling.

Figure 3:
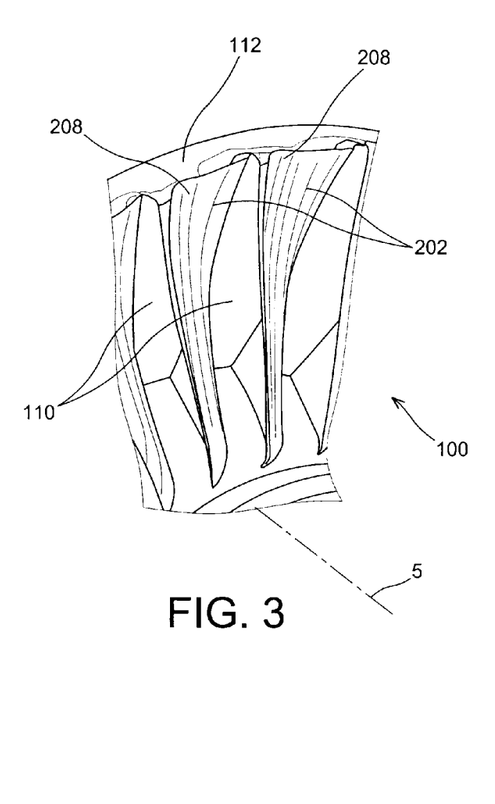
FIGS. 3 to 5 illustrate views sketching subsequent steps of the manufacturing process.

Here, the preforms 102 are preferably machined one after the other to each form a profiled vane blank 202, as shown in FIG. 3 also depicting the heads 208 of the blanks 202 interconnected by the ring 112, still forming a peripheral annular portion of the block 100.

Figure 4:
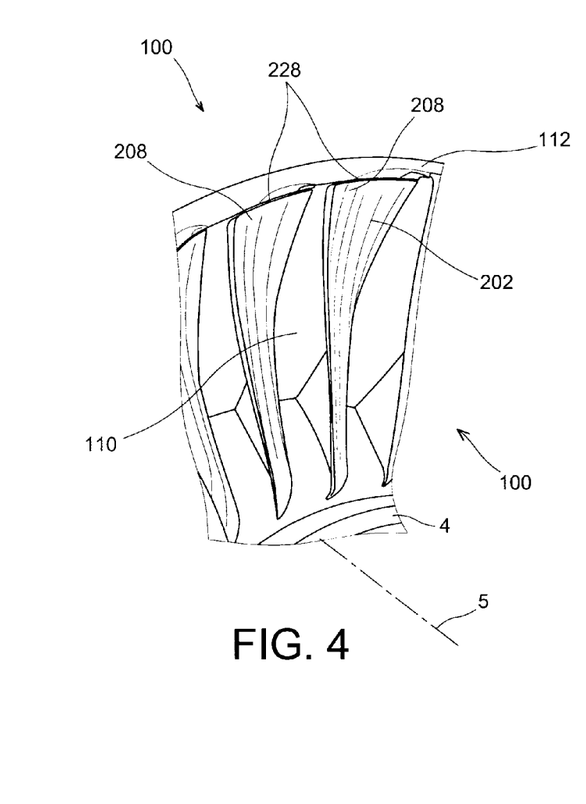

The process is then continued by a step which removes the ring 112 connecting the preforms 112. This step is carried out by any appropriate way by the person skilled in the art, such as wire cutting or milling. In this respect, FIG. 4 schematically illustrates separation of the ring 112 from the rest of the block 100, by breaking the bond between this ring 112 and the heads 208 of the blanks. Once all these substantially circumferential breaks 228 are made, the ring can effectively be extracted from the block by relative shift according to the axis 5 vis-à-vis the latter. The ring 112 is thus considered as cancelled. Here also, alternatively, the process could continue with removal of the ring 112 merely by removal of the portions of the latter located between the blanks 202, the other portions located at the radial end of these blanks then being retained, for example in light of subsequently constituting part of the vane heads. The desired breaks are no longer substantially circumferential as the breaks 228 of FIG. 2d, but substantially radial, and still in the thickness of the block.

Figure 5:
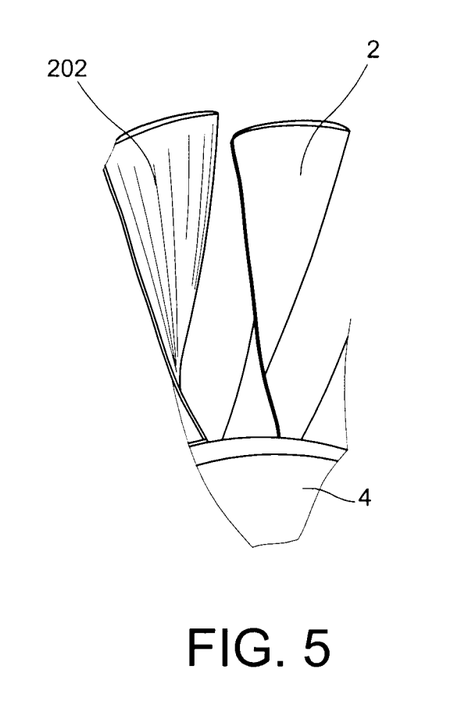

Next, a novel milling step is used, this so-called finishing step aimed at obtaining, by milling, the vanes 2 of final profile, from the blanks 202. The tool used enables more precise machining, ensuring the final sides, and thus producing the vanes 2, as is shown in the right part of FIG. 5.

At this stage of the process, the block of material remaining has a volume of less than 25% of the volume of this same block, such as presented just before initiation of the cutout step by abrasive water jet, specifically just after the above turning step.

Also, the process can be continued by one or more classic steps, including, as indicated hereinabove, a polishing step, a blasting step, a step for cutting the vanes to length, and/or a balancing step of the MVD.

Of course, various modifications can be made by the person skilled in the art to the invention which has just been described, solely by way of non-limiting examples.

The invention claimed is:

1. A process for manufacturing a monobloc vaned disc, comprising:
   a cutout by abrasive water jet of a block of material in general form of a disc, carried out so as to remove material from the block at a level of inter-vane spaces to reveal vane preforms extending radially from a hub, the cutout by abrasive water jet comprising, for making each inter-vane space:
      a first triple-axis cutout of a piece passing through the thickness of the block, cut such that the cutout piece escapes from the block automatically by gravity; followed by
      at least one enhancement cutout.

2. The manufacturing process as claimed in claim 1, wherein the cutout by abrasive water jet, carried out by a tool including an ejection head of an abrasive water jet, comprises:
   the first triple-axis cutout, carried out with the ejection head opposite a first face of the block; followed by
   a plurality of enhancement cutouts, wherein at least one of the enhancement cutouts is carried out with the ejection head opposite the first face of the block, and at least one of the enhancement cutouts is carried out with the ejection head opposite a second face of the block, opposite the first.

3. The manufacturing process as claimed in claim 2, wherein, during the cutout by abrasive water jet for making the inter-vane spaces, the following are successively carried out:
   carrying out all the cutouts requiring the ejection head opposite the first face of the block;
   making a relative shift between the block and the ejection head to guide the ejection head opposite the second face of the block; and
   carrying out all the cutouts requiring the ejection head opposite the second face of the block.

4. The manufacturing process as claimed in claim 3, wherein the relative shift between the block and the ejection head is made by turning over the block.

5. The manufacturing process as claimed in claim 1, wherein the cutout by abrasive water jet is carried out such that during the at least one enhancement cutout, one cutout piece escapes from the block automatically by gravity.

6. The manufacturing process as claimed in claim 1, wherein the cutout by abrasive water jet is carried out such that, during the at least one enhancement cutout, at least one cutout piece is split, by cutting by abrasive water jet, into at least two sub-pieces capable of escaping from the block automatically by gravity.

7. The manufacturing process as claimed in claim 1, wherein each enhancement cutout is a five-axis cutout.

8. The manufacturing process as claimed in claim 1, wherein the cutout by abrasive water jet of the block of material is carried out so as to reveal the vane preforms extending radially from the hub, while preserving a material forming connecting means between at least two directly consecutive vane preforms, the connecting means being spaced radially from the hub.

9. The manufacturing process as claimed in claim 1, further comprising:
   a milling of the vane preforms carried out so as to obtain profiled vane blanks; and
   a finishing milling step of the vane blanks, so as to obtain vanes with a final profile.

* * * * *